United States Patent
Herrmann

(10) Patent No.: US 7,495,354 B2
(45) Date of Patent: Feb. 24, 2009

(54) GAS TURBINE, PARTICULARLY AN AIRCRAFT ENGINE

(75) Inventor: Hubert Herrmann, Haimhausen (DE)

(73) Assignee: MTU Aero Engines GmbH, Munich (DE)

(*) Notice: Subject to any disclaimer, the term of this patent is extended or adjusted under 35 U.S.C. 154(b) by 0 days.

(21) Appl. No.: 10/582,917

(22) PCT Filed: Nov. 20, 2004

(86) PCT No.: PCT/DE2004/002572

§ 371 (c)(1),
(2), (4) Date: Jun. 13, 2006

(87) PCT Pub. No.: WO2005/059316

PCT Pub. Date: Jun. 30, 2005

(65) Prior Publication Data

US 2007/0152534 A1    Jul. 5, 2007

(30) Foreign Application Priority Data

Dec. 18, 2003   (DE) ............................... 103 59 559

(51) Int. Cl.
*F02K 11/00* (2006.01)
(52) U.S. Cl. .................... 290/52; 60/226.11
(58) Field of Classification Search ........... 290/52, 290/40 C; 60/226.1, 39.511
See application file for complete search history.

(56) References Cited

U.S. PATENT DOCUMENTS 4,514,991 A * 5/1985 Zinsmeyer .................. 62/209

(Continued)

FOREIGN PATENT DOCUMENTS

DE           41 31 713           4/1993

(Continued)

OTHER PUBLICATIONS

Provost, M. J., Ed.; "The More Electric Aero-Engine: A General Overview From an Engine Manufacturer"; IEEE, Proceedings of the 14th International Symposium on Power Semiconductor Devices & ICs; Jun. 4-7, 2002; Santa Fe, NM, USA; pp. 246-251.

*Primary Examiner*—Nicholas Ponomarenko
(74) *Attorney, Agent, or Firm*—W. F. Fasse; W. G. Fasse

(57) ABSTRACT

A gas turbine, particularly an aircraft engine includes at least one compressor. The gas turbine comprises at least one stator, at least one rotor and at least one generator (19) for generating electrical energy. An engine rotor has a rotor shaft (11) and rotor disks (12, 13, 14), which are driven by the rotor shaft (11) and which have rotating rotor blades (15). A stator has a housing (17) and fixed guide vanes (18). A generator (19) has at least one stator (21) and at least one rotor (20). The electrical energy generated by the generator (19) preferably serves to operate at least one attachment or one auxiliary unit of the gas turbine. According to the invention, the generator (19) is integrated in the interior of the gas turbine in such a manner that each rotor (20) of the generator is allocated to the compressor rotor and the stator (21) of the generator is allocated to the compressor stator, whereby kinetic energy of the rotor is convertible into electrical energy by the generator (19).

15 Claims, 5 Drawing Sheets

U.S. PATENT DOCUMENTS

| | | | |
|---|---|---|---|
| 5,309,029 A * | 5/1994 | Gregory et al. | 290/1 R |
| 5,497,615 A * | 3/1996 | Noe et al. | 60/39.511 |
| 5,867,979 A | 2/1999 | Newton et al. | |
| 6,158,210 A * | 12/2000 | Orlando | 60/226.1 |
| 6,294,842 B1 * | 9/2001 | Skowronski | 290/7 |
| 6,355,987 B1 * | 3/2002 | Bixel | 290/52 |
| 6,459,750 B1 | 10/2002 | Itoo et al. | |
| 6,895,741 B2 * | 5/2005 | Rago et al. | 60/226.1 |
| 6,914,344 B2 * | 7/2005 | Franchet et al. | 290/52 |
| 7,285,871 B2 * | 10/2007 | Derouineau | 290/52 |

FOREIGN PATENT DOCUMENTS

GB     1041587     9/1966

* cited by examiner

GAS TURBINE, PARTICULARLY AN AIRCRAFT ENGINE

FIELD OF THE INVENTION

The invention relates to a gas turbine, particularly an aircraft engine having at least one electrical generator incorporated into the engine particularly into an engine compressor.

DESCRIPTION OF RELATED ART

In addition to the forward thrust for advancing an aircraft, aircraft engines, whether commercial aircraft engines or military aircraft engines, also produce energy for operating of attachment devices and secondary aggregates, respectively, of a gas turbine aircraft engine or for operating of aircraft-borne systems such as an air conditioning system. The attachment devices, secondary aggregates or even aircraft-borne systems driven by an aircraft engine can be hydraulic, pneumatic electric, or electric motor driven devices, aggregates or systems.

A clear trend can be recognized in the development of aircraft that ever more electrical energy is required in an aircraft. This requirement is due on the one hand to the fact that hydraulically or pneumatically operated attachment devices or auxiliary aggregates of the gas turbines are being replaced by attachment devices or auxiliary aggregates that are driven by an electric motor. On the other hand, an ever increasing energy requirement is necessary for each seat in the aircraft. The aircraft engines thus must make available an ever increasing electrical power or rather an ever increasing electrical energy. Such aircraft engines are also referred to as "More Electric Engine" (MEE).

For producing electrical energy to be supplied to attachment devices or auxiliary aggregates of the gas turbine as well as to the aircraft-borne systems it is known in the prior art to pick up mechanical energy from the core engine of a gas turbine for example for driving pumps or generators. German Patent Publication DE 41 31 713 C2 shows an aircraft engine wherein shaft power is taken off from the core engine. This shaft power is supplied to auxiliary aggregates.

According to the state of the art, generators for producing electrical energy are constructed as auxiliary aggregates or as attachment devices of the gas turbine. Thus, these items are constructed as separate structural units and mounted outside of the area of the actual gas turbine.

BRIEF SUMMARY OF THE INVENTION

Starting from the above it is the object of the present invention to construct a new gas turbine, particularly a new aircraft engine.

This object has been achieved according to the invention, in that at least one electric generator is integrated into the inside of the gas turbine in such a way that a generator rotor or each generator rotor of the generator or generators is allocated to the engine rotor and so that a generator stator or each generator stator of the electrical generator is allocated to the engine stator of the engine. Thus, kinetic energy of the engine rotor is convertible by the electric generator into electric energy. More specifically, pole pieces of the electrical generator are integrated into the engine or compressor rotor blades or these generator pole pieces are allocated to the radially outward ends of the engine or compressor rotor blades, so that the engine or compressor rotor blades and generator rotor blades form a single unitary rotor structure. Thus, there is only one rotor serving simultaneously as generator rotor and as compressor or engine rotor. The or each generator stator is preferably allocated to the housing of the engine stator and/or to the stationary guide vanes of the engine stator.

In accordance with the present invention it is suggested to integrate the generator for producing electrical energy into the interior of the gas turbine. Thereby, a simplification of the construction of a gas turbine constructed as a "More Electric Engine" is achieved.

According to an advantageous further development of the invention, the or each generator rotor is allocated to the rotor shaft of the engine rotor whereby the or each generator rotor comprises several pole pieces which are secured to the engine rotor shaft either as a unit or individually. The or each generator stator of the generator is then preferably allocated to a stator-side bearing block of the engine rotor shaft.

Preferably, an electrical control makes it possible to operate the generator as a motor for starting the gas turbine and to use the generator for producing electrical energy after the start of the gas turbine. Extra electrical energy produced by the generator is preferably supplyable to the gas turbine for driving the rotor of the gas turbine while the generator operates as a motor.

BRIEF DESCRIPTION OF THE DRAWINGS

Example embodiments of the invention are described in more detail with reference to the accompanying drawings, wherein the figures show.

DETAILED DESCRIPTION OF THE INVENTION AND OF THE BEST MODE OF THE INVENTION

Figure 1:
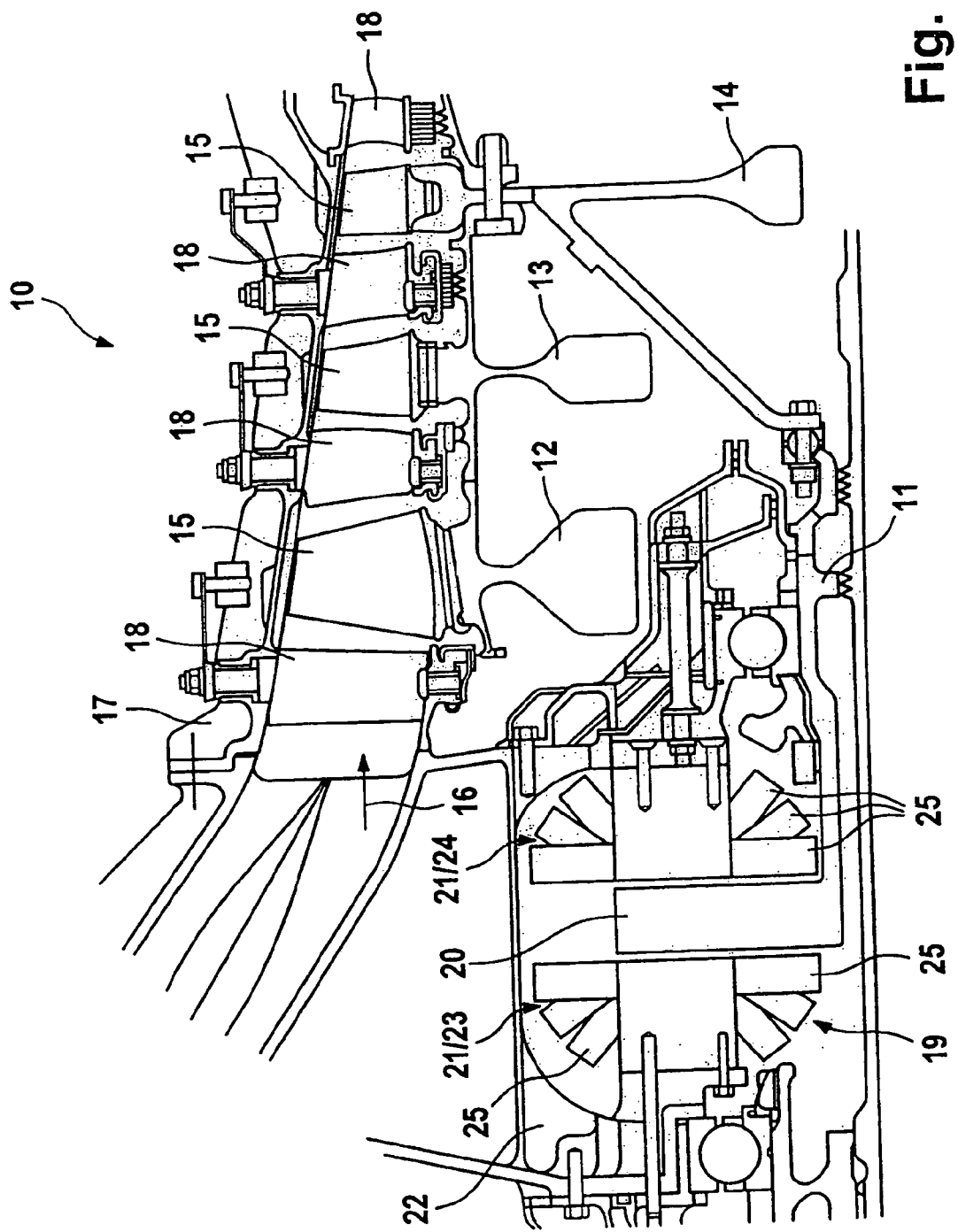
FIG. 1 a schematized portion of a cross section through a gas turbine according to the invention in accordance with a first example embodiment of the invention.

FIG. 1 shows a partial cross section through a high pressure compressor 10 of a gas turbine, whereby the high pressure compressor 10 comprises a compressor rotor and a compressor stator. In the illustrated example embodiment, the compressor rotor comprises a compressor rotor shaft 11 which drives a total of three compressor rotor discs 12, 13 and 14. Compressor rotor blades 15 are arranged on each of the compressor rotor discs 12, 13 and 14 positioned next to each other in the circumferential direction. The compressor rotor blades 15 rotate together with the compressor rotor discs 12, 13 and 14. The compressor rotor blades 15 allocated to a rotor disc 12 or 13 or 14 form so called compressor rotor blade rings. The compressor rotor blade rings are arranged one behind the other in the throughflow direction indicated by an arrow 16 or in the axial direction of the high pressure compressor 10. The compressor rotor blade rings are formed by the compressor rotor discs 12, 13 and 14 and the corresponding compressor rotor blades 15. Thus, the compressor rotor of the high pressure compressor 10 is formed at least by the rotor shaft 11, the rotor discs 12, 13 and 14 and the rotor blades 15.

The compressor stator of the high pressure compressor 10 comprises a compressor stator housing 17 and compressor stator guide vanes 18. The guide vanes 18 and the housing 17 are constructed to be stationary. The guide vanes 18 form guide vane rings which are arranged one behind the other just as the rotor blade rings, in the throughflow direction (arrow 16) of the high pressure compressor 10. Thus, one compressor rotor blade ring of rotating compressor rotor blades 15 is arranged between two respective neighboring compressor guide vane rings made up by the stationary compressor guide vanes 18. The compressor rotor blade rings thus rotate relative to the stationary compressor stator housing 17 and relative to the also stationary compressor guide vanes 18 forming stationary rings.

According to the invention an electrical generator 19 is integrated into the interior of the high pressure compressor 10 in such a way that a generator rotor 20 is allocated to the compressor rotor and a generator stator 21 is allocated to the compressor stator. The kinetic energy of the compressor rotor is converted by the generator 19 into electrical energy. In the example embodiment shown in FIG. 1, the generator rotor 20 of the electrical generator 19 is allocated to the compressor rotor shaft 11 of the high pressure compressor 10. The generator stator 21 of the generator 19 is allocated to a stationary bearing block 22 of the compressor rotor shaft 11. The bearing block 22 is positioned on the side of the compressor stator. In the example embodiment of FIG. 1, the electrical generator 19 is constructed as a transversal flow machine according to the principle of a so called "Switched Reluctance Machine". The generator stator 21 of the generator 19 is formed in this case by two partial generator stator sections 23 and 24. Each of the two generator stator sections 23 and 24 is secured to the bearing block 22 and comprises a complete set of generator stator windings 25. The two generator stator sections 23 and 24 of the generator 19 are spaced from each other in the axial direction of the gas turbine 10 to form a rotor gap. The generator rotor 20 of the generator 19 rotates in the gap between these two generator stator sections 23 and 24 of the generator 19.

Figure 2:
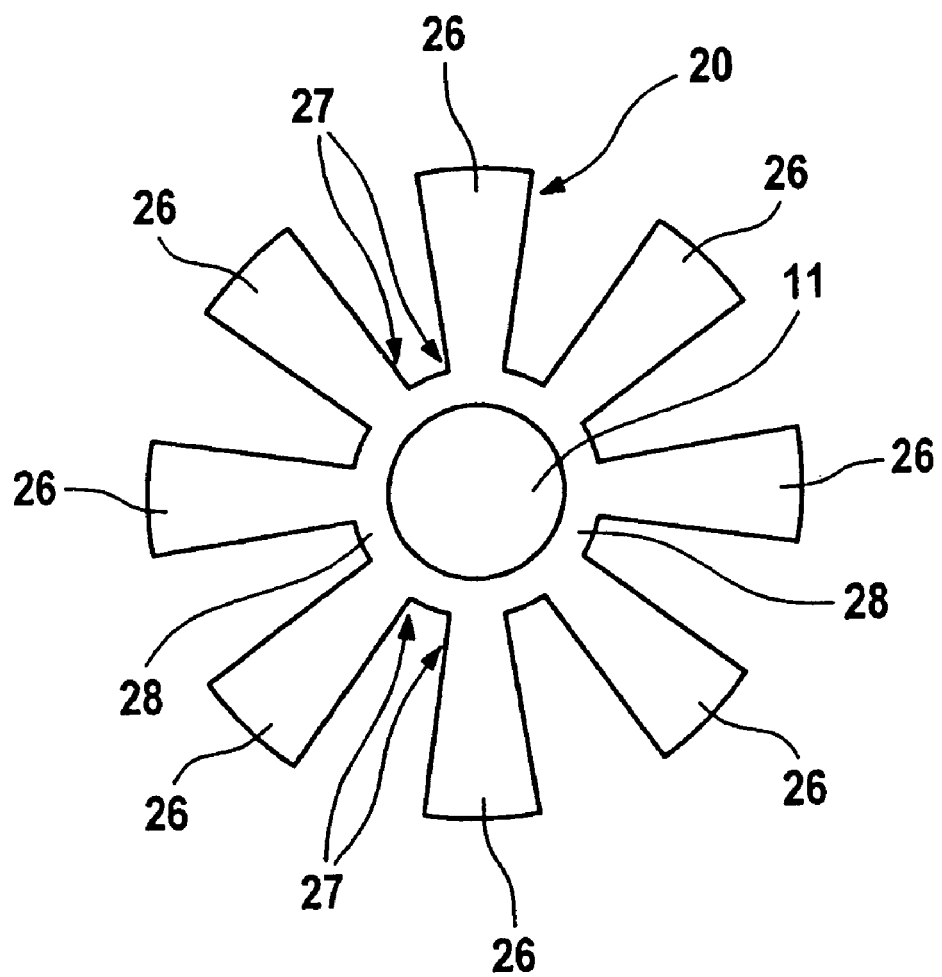
FIG. 2 a detail of the arrangement according to FIG. 1 in a front view.

The generator rotor 20 of the generator 19 is preferably secured to the compressor rotor shaft 11 of the compressor rotor as shown in FIG. 2. In the example embodiment of FIG. 2, the generator rotor 20 comprises eight pole pieces 26 constructed as soft iron poles. The pole pieces 26 are interconnected with each other at their radially inwardly located ends 27 by an element 28 formed as a hollow cylinder. The inner diameter of the hollow cylinder element 28 is adapted to the outer diameter of the compressor rotor shaft 11 so that the generator rotor 20 of the electrical generator 19 can be stuck or mounted as a unit onto the compressor rotor shaft 11 to be connected with the compressor rotor shaft 11.

However, other methods of securing the generator rotor to the compressor rotor shaft 11 are possible as distinguished from the illustrated example embodiment. Thus, the pole pieces 26 of the generator rotor 20 can be secured individually to the compressor rotor shaft 11 so that the radially inwardly positioned ends of the pole pieces 26 are directly secured to the outer surface of the compressor rotor shaft 11. In that embodiment the hollow cylinder element 28 is not needed.

Figure 3:
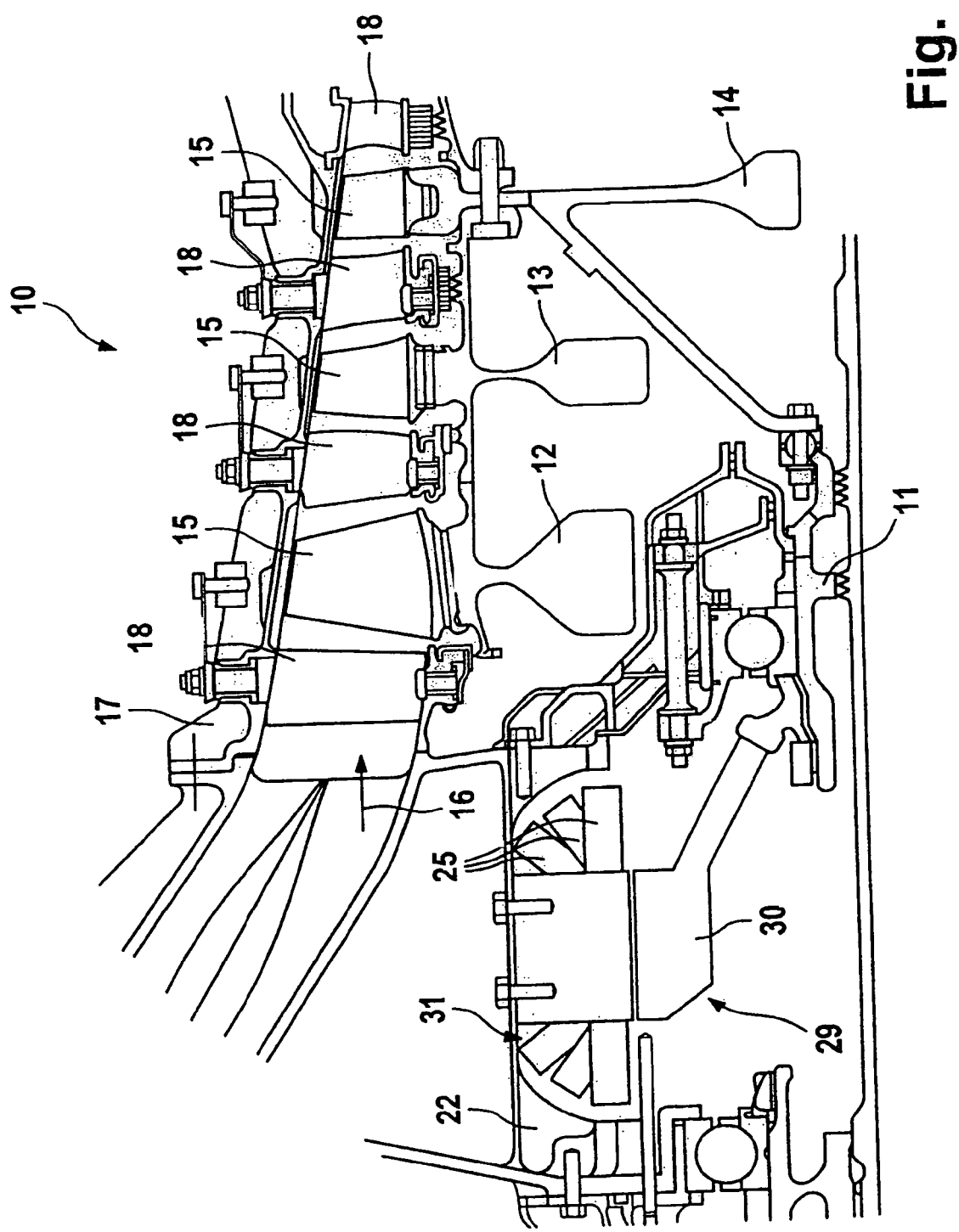
FIG. 3 a schematized portion of a cross section of a gas turbine according to the invention in accordance with a second example embodiment of the invention.

As already mentioned, in the example embodiment of FIG. 1 the generator 19 is constructed as a transversal flow machine. In distinction to FIG. 1, FIG. 3 shows that an electrical generator 29 can also be integrated into a high pressure compressor 10 which is constructed as a so called drum or cylindrical rotor machine. The example embodiments according to FIGS. 1 and 3 are distinguished from each other only by the detailed construction of the electrical generators 19 and 29. Therefore, in FIG. 3 the same reference numbers are used for the same structural groups and reference is made to the explanations with respect to FIG. 1.

Also in the example embodiment of FIG. 3 a generator rotor 30 of the generator 29 is allocated to the compressor rotor shaft 11 and a generator stator 31 is allocated to the stationary bearing block 22 of the high pressure compressor 10. In the example embodiment of FIG. 1 the generator rotor 20 of the generator 19 rotates between two partial generator stator sections 23 and 24 positioned with an axial spacing from each other. On the other hand, in the example embodiment of FIG. 3 the rotor 30 rotates relative to a generator stator 31 which encloses the generator rotor 30 radially outwardly and circumferentially. Compared to the example embodiment of FIG. 3 in which the generator 29 is constructed as a drum rotor machine, the embodiment of FIG. 1 in which the generator 19 is constructed as a transversal flow machine has the advantage that the air gap between the generator rotor 20 and the generator stator 21 is not changed by radial expansions of the generator rotor 20 caused by centrifugal force and heat. However, in the example embodiment of FIG. 1, compared to the example embodiment of FIG. 3, it is disadvantageous that the two partial generator stators 23 and 24 attract each other in the axial direction so that these generator stator sections 23, 24 must be secured to the bearing block 22 with a sufficient force take-up. Thus, the example embodiments of FIGS. 1 and 3 have certain advantages.

Figure 4:
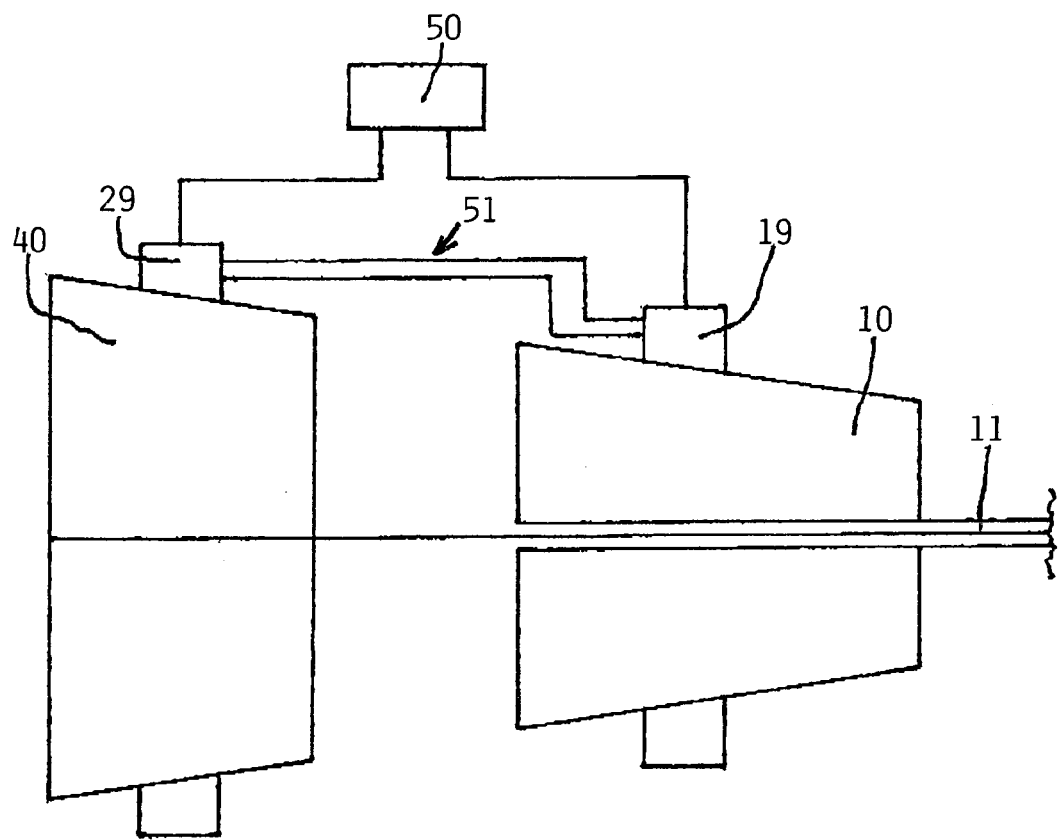
FIG. 4 shows a block arrangement of a high pressure compressor and low pressure compressor each with a generator and a respective control.

As shown in FIG. 4, it is further in accordance with the present invention to provide control means 50 for the electrical generators 19 and 29 of one or two gas turbines or to the generators 19, 20 of the illustrated high pressure compressor 10 and low pressure compressor 40. Allocation of control means 50 to but one generator 19 or 29 is also possible. These control means 50 make it possible, on the one hand, to operate the generator 19 or 29 as a generator for producing electrical energy from the kinetic energy of the compressor rotor and, on the other hand, to operate one generator as a motor for driving the compressor rotor shaft 11 on the basis of electrical energy available in the aircraft or made available by the other generator working as such or vice versa. More specifically, it is within the teaching of the present invention to operate the generator 19 and/or 29 not only for producing electrical energy but to operate one of the generators 19 or 29 as a motor with electrical energy from the other generator for driving the compressor rotor shaft 11. Using the generator 19 or 29 in a motor operation comes particularly into consideration for starting the gas turbine. Thus, the compressor rotor shaft 11 of the high pressure compressor 10 can be driven up to a rated rpm with the aid of the generators 19 and 29 by supplying electrical energy from one generator to the other working as a motor. Following the starting of the gas turbine, the generators 19 and 29 are used for producing electrical energy as controlled by the control means 50. The two generators 19 and 29 are electrically coupled to each other at 51 for supplying electrical energy to one generator operating as a motor from the generator operating as a generator and vice versa.

It is also in accordance with the present invention to integrate not only a generator 19 or 29 into the high pressure compressor 10 in the manner as described above but rather it is possible to integrate a generator into the low pressure compressor 40 shown in FIG. 4. If respective generators are integrated into the high pressure compressor 10 as well as into the low pressure compressor 40, it is in accordance with the present invention to electrically couple the generators of the high pressure compressor 10 and of the low pressure compressor 40 with each other. A respective coupling 51 interconnecting the generators 19 and 29 is shown in FIG. 4.

Thereby, it is possible to provide for a power equalization between the high pressure compressor 10 and the low pressure compressor 40. For example, if the generator 19 of the high pressure compressor 10 produces more electrical energy than is necessary, then it is possible in this case to use the generator 29 of the low pressure compressor 40 in a motor operation in order to use the excess electrical energy for driving the rotor shaft 11 of the low pressure compressor 40. Heretofore, according to the prior art, it was necessary to use-up the excess electrical energy as lost heat in a resistor unit. In accordance with the present invention, it is possible to return excess electrical energy produced by one generator, into the gas turbine as kinetic energy provided by the generator currently operating as a motor driven by the excess electrical energy to thereby improve the overall efficiency of the gas turbine. More specifically, it is possible, in the case in which the generator 29 of the low pressure compressor 40 produces too much electrical energy, to return this excess electrical energy to the generator 19 of the high pressure compressor 10 whereby the generator 19 of the high pressure compressor 10 operates as a motor by using excess electrical energy of the generator 29 of the low pressure compressor 40 for driving the rotor shaft of the high pressure compressor 10.

In accordance with the present invention it is further suggested that the windings 25 of the generator stators 21 or 31 of the generators 19 or 29 are cooled with fuel. Thus, it is within the teachings of the invention to construct the windings 25 as hollow conductor windings and to feed the fuel through these hollow windings for cooling. The fuel flowing through the windings 25 can then be further conducted to fuel injection nozzles in the area of the combustion chamber of the gas turbine. Such a cooling of the windings 25 of the generator stators 21 or 31 by fuel permits an especially efficient cooling of the windings 25 thereby obviating the conventional expensive oil cooling.

FIGS. 1 and 3 show only a partial axial longitudinal section through the high pressure compressor 10 so that in FIGS. 1 and 3 only that portion of the high pressure compressor 10 is seen that extends above the rotor shaft 11. The structural components shown in FIGS. 1 and 3 extend around the rotor shaft 11 in the circumferential direction. In order to make possible a simpler mounting of the generator stators 21 and 31 of the generators 19 and/or 29 it is suggested in accordance with a further aspect of the present invention to construct the generator stators 21 and 31 respectively in at least two sections. Each of the two stator sections of the generator stators 21 and 31 would extend around the rotor shaft 11 for 180° in the circumferential direction in a two-part embodiment. Other divisions of the generator stators 21, 31 are also possible whereby the angular or circumferential extension is automatically determined by the division of the generator stators 21 and 31. For example, if there are four stator sections each would extend for 90° in the circumferential direction. In order to make possible a division of the generator stators 21 and 31, two measures are suggested according to the present invention. As a first measure, the windings 25 of the generator stators 21 and 31 respectively are to be constructed as wave windings. According to a second measure it is suggested to select the number of stator slots or grooves, the number of pole pieces, the stator diameter and other generator design parameters in such a way that only one winding is required for each stator slot and that each stator section carries the entire required number of windings which are necessary for generating the electrical energy. It has thus also been recognized according to the present invention that by constructing the windings as wave windings in combination with the requirement that only one winding is provided for each stator slot, it becomes possible to divide the generator stators 21 and 31 to provide divided sections to substantially simplify the assembly and disassembly of the gas turbine.

In the above described example embodiments, of FIGS. 1 to 3 the generator rotors 20 and 30 of the generators 19 and 29, respectively, are allocated to the rotor shaft 11. More specifically, the generator stators 21 and 31 of the generators 19, 29, respectively, are allocated to bearing blocks 22 of the compressor or engine rotor shaft 11.

Figure 5:
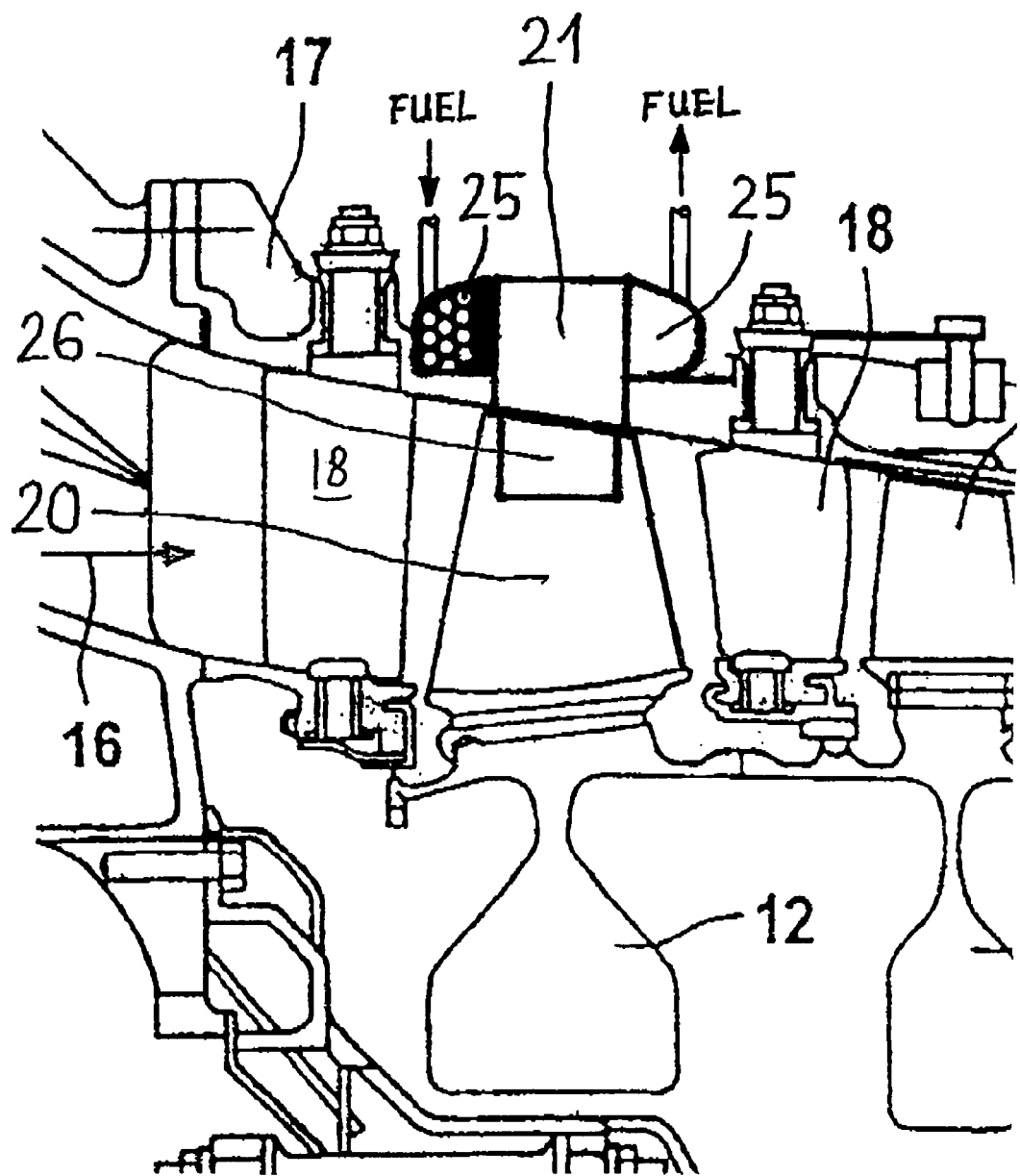
FIG. 5 shows a view similar to FIG. 3 with a generator integrated directly into a rotor and stator of a turbine compressor.

FIG. 5 shows a further embodiment according to the invention, wherein the generator rotor 20 of the generator 19 is allocated to at least one rotatable compressor rotor blade 15. Pole pieces 26 constructed as soft iron poles may, for example, be allocated to the radially outwardly positioned ends of the rotatable compressor rotor blades 15 to rotate together with the compressor rotor blades 15 relative to the stationary housing 17 and relative to the stationary compressor guide vanes 18. In this case shown in FIG. 5 it is necessary that the rotating rotor blades 15 are constructed in such a way that they safely take up the additional centrifugal forces caused by the soft iron pole pieces 26. In the case in which the pole pieces 26 of the rotor are allocated to the rotating rotor blades, the generator stator 21, 31 of the respective generator is allocated either to the stationary compressor guide vanes 18 or to the stationary housing 17 of the compressor stator of the gas turbine. In this manner it is also possible to integrate a generator into the gas turbine, whereby the hollow stator generator windings 25 are secured to the generator stator 21 as shown in FIG. 5. The hollow windings 25 are connected to a fuel flow for cooling these windings. The generator rotor 20 and the compressor rotor blades 15 form a single, unitary structure also as shown in FIG. 5. Stated more specifically at least one rotor section works as generator rotor and as compressor rotor.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The invention claimed is:

1. A gas turbine engine comprising at least one compressor comprising a compressor stator including a compressor stator housing and stationary compressor guide vanes mounted in said compressor stator housing, said gas turbine compressor further comprising a compressor rotor including a rotor shaft, compressor rotor discs secured to said rotor shaft, compressor rotor blades secured to said compressor rotor discs, said gas turbine compressor further comprising at least one electrical generator including a generator stator allocated to said compressor stator and a generator rotor allocated to said compressor rotor, said generator rotor comprising generator rotor blades integrated into said compressor rotor blades (15) so that said generator rotor blades and said compressor rotor blades are a unitary rotor structure, said unitary rotor structure comprising pole pieces movable with said unitary rotor structure for cooperation with said generator stator when said unitary rotor structure rotates.

2. The gas turbine engine of claim 1, wherein said pole pieces of said unitary rotor structure are said generator rotor blades which also function as compressor rotor blades.

3. The gas turbine engine of claim 1, wherein said pole pieces are mounted to radially outward ends of said generator rotor blades which also function as compressor rotor blades.

4. The gas turbine engine of claim 1, wherein said generator stator is mounted to said compressor stator housing.

5. The gas turbine engine of claim 1, wherein said generator stator is mounted to said stationary compressor guide vanes mounted in said compressor stator housing.

6. The gas turbine engine of claim 1, comprising means for cooling said generator stator windings by engine fuel.

7. The gas turbine engine of claim 6, wherein said generator stator windings are hollow for said engine fuel to flow through said hollow windings.

8. The gas turbine engine of claim 1, further comprising control means (50) operatively connected to said at least one electrical generator for operating said at least one electrical generator as a motor for starting said gas turbine engine and for operating said at least one electrical generator for producing electrical energy when said gas turbine engine has started.

9. The gas turbine engine of claim 1, comprising two electrical generators and two compressors, wherein one electrical generator of said two electrical generators is allocated to each of said two compressors, a coupling (51) electrically interconnecting said two electrical generators with one another, said gas turbine engine further comprising control means (50) operatively connected to said two electrical generators for operating one of said two electrical generators as a motor with electrical energy provided by the other electrical generator and vice versa.

10. The gas turbine engine of claim 9, wherein said two compressors comprise a high pressure compressor and a low pressure compressor, and wherein each compressor has integrated therein one electrical generator of said two electrical generators.

11. The gas turbine of claim 10, wherein said control means (50) are operatively connected to said electrical generator of said low pressure compressor and to said electrical generator of said high pressure compressor, wherein said coupling (51) electrically interconnecting said two electrical generators of said low pressure compressor and of said high pressure compressor, also couples said low pressure compressor and said high pressure compressor to one another through said generators so that, in response to said control means (50), said two electrical generators can equalize the power output of said low pressure compressor to the power output of said high pressure compressor and vice versa.

12. The gas turbine engine of claim 10, wherein electrical energy produced by said electrical generator of said high pressure compressor is used to operate said electrical generator of said low pressure compressor and vice versa.

13. A gas turbine engine comprising at least one compressor comprising a compressor stator including a compressor stator housing and stationary compressor guide vanes mounted in said compressor stator housing, said gas turbine compressor further comprising a compressor rotor including a rotor shaft, compressor rotor discs secured to said rotor shaft, compressor rotor blades secured to said compressor rotor discs, said gas turbine compressor further comprising at least one electrical generator including a generator stator allocated to said compressor stator and a generator rotor allocated to said compressor rotor, wherein said generator stator (21) comprises two generator stator sections (23, 24), each generator stator section comprising at least one stator winding, said generator stator sections being axially spaced from one another to form a radially extending generator rotor gap between said generator stator sections, said generator rotor comprising pole pieces positioned for cooperation with said at least one stator winding, said generator rotor being secured to said rotor shaft in a position for rotating in said radially extending generator rotor gap between said generator stator sections.

14. The gas turbine engine of claim 13, further comprising means for cooling said generator stator windings by engine fuel.

15. The gas turbine engine of claim 14, wherein said generator stator windings are hollow for said engine fuel to flow through said hollow windings.

\* \* \* \* \*